United States Patent
Liang et al.

(10) Patent No.: US 10,669,216 B2
(45) Date of Patent: Jun. 2, 2020

(54) HIGH TEMPERATURE AND BRIGHT RED INK-JET INK FOR CERAMIC DECORATION, ITS PREPARATION METHOD AND APPLICATION THEREOF

(71) Applicants: GUANGDONG WINTO CERAMICS CO., LTD., Foshan, Guangdong (CN); JINGDEZHEN CERAMIC INSITITUTE, Jingdezhen, Jiangxi (CN); GUANGDONG HONGYU NEW MATERIALS CO., LTD., Qingyuan, Guangdong (CN); GUANGDONG HOMEWAY CERAMICS INDUSTRY CO., LTD., Qingyuan, Guangdong (CN); GUANGDONG HONGHAI CERAMICS INDUSTRIAL CO., LTD., Guangdong (CN)

(72) Inventors: Tongcan Liang, Guangdong (CN); Yongqing Wang, Jiangxi (CN); Guoming Yu, Guangdong (CN); Jiarui Ou, Guangdong (CN)

(73) Assignees: GUANGDONG WINTO CERAMICS CO., LTD., Foshan, Guangdong (CN); JINGDEZHEN CERAMIC INSTITUTE, Jingdezhen, Jiangxi (CN); GUANGDONG HONGYU NEW MATERIALS CO., LTD., Qingyuan, Guangdong (CN); QUANGDONG HOMEWAY CERAMICS INDUSTRY CO., LTD., Qingyuan, Guangdong (CN); GUANGDONG HONGHAI CERAMICS INDUSTRIAL CO., LTD., Qingyuan, Guangdong (CN)

( * ) Notice: Subject to any disclaimer, the term of this patent is extended or adjusted under 35 U.S.C. 154(b) by 385 days.

(21) Appl. No.: 15/572,481

(22) PCT Filed: May 18, 2015

(86) PCT No.: PCT/CN2015/079170
§ 371 (c)(1),
(2) Date: Nov. 7, 2017

(87) PCT Pub. No.: WO2016/176872
PCT Pub. Date: Nov. 10, 2016

(65) Prior Publication Data
US 2018/0105473 A1    Apr. 19, 2018

(30) Foreign Application Priority Data

May 7, 2015    (CN) ............................ 201510229896

(51) Int. Cl.
*C09K 3/00*    (2006.01)
*C04B 41/86*   (2006.01)
(Continued)

(52) U.S. Cl.
CPC .............. *C04B 41/86* (2013.01); *C03C 3/105* (2013.01); *C03C 8/12* (2013.01); *C03C 8/20* (2013.01);
(Continued)

(58) Field of Classification Search
USPC ........................................... 106/31.01, 31.05
See application file for complete search history.

(56) References Cited

FOREIGN PATENT DOCUMENTS

| | | | | |
|---|---|---|---|---|
| CN | 104130024 A | * | 11/2014 | |
| EP | 3050857 A1 | * | 8/2016 | ........... H01L 33/502 |
| JP | 2008081346 A | * | 4/2008 | |

* cited by examiner

*Primary Examiner* — James E Mcdonough
(74) *Attorney, Agent, or Firm* — Houtteman Law LLC

(57) ABSTRACT

The present invention provides a high temperature and bright red ink-jet ink for ceramic decoration, its preparation (Continued)

method and application thereof. On the base that the existing ink-jet ink production process, ink-jet printing equipment and ink-jet printing process are not made major changes, high temperature bright red ink basic glaze powder composition, basic glaze frit powder composition, solvent composition, basic glaze powder and bright red pigment grinding method and particle size optimization, ink composition and processing methods are adjusted and optimized. Thus the performance of high temperature bright red ink can meet the requirement of the use of ink-jet printing machine, and after high temperature firing (1080° C.~1230° C.), the surface decoration color of ceramic tile sprayed a single printed high temperature bright red is bright red, colorful, pure red, and at the superposing place with other color ink-jet printing ink, the color is bright, colorful, color gamut broad. At the same time, the technology has strong universality and is easy to popularize in the industry.

5 Claims, 1 Drawing Sheet

(51) Int. Cl.
| | | |
|---|---|---|
| *C03C 8/12* | (2006.01) | |
| *C04B 41/50* | (2006.01) | |
| *C03C 3/105* | (2006.01) | |
| *C03C 8/20* | (2006.01) | |
| *C04B 41/00* | (2006.01) | |
| *C09D 11/322* | (2014.01) | |
| *C09D 11/38* | (2014.01) | |
| *C09D 1/00* | (2006.01) | |
| *C09D 4/00* | (2006.01) | |
| *C09D 5/00* | (2006.01) | |
| *C09D 11/00* | (2014.01) | |
| *B41M 5/00* | (2006.01) | |

(52) U.S. Cl.
CPC ........ *C04B 41/009* (2013.01); *C04B 41/5022* (2013.01); *C09D 11/322* (2013.01); *C09D 11/38* (2013.01); *B41M 5/007* (2013.01); *B41M 5/0047* (2013.01)

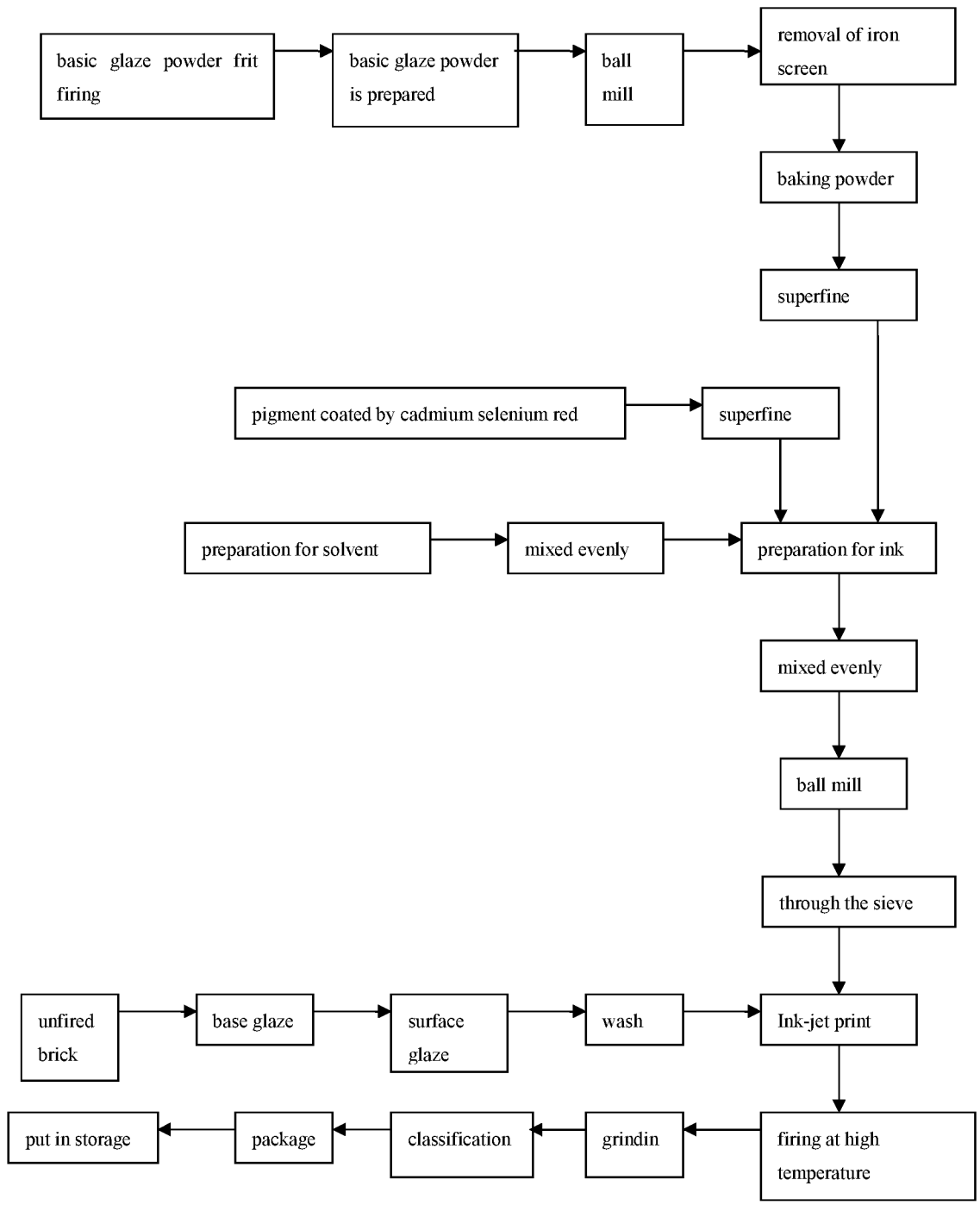

HIGH TEMPERATURE AND BRIGHT RED INK-JET INK FOR CERAMIC DECORATION, ITS PREPARATION METHOD AND APPLICATION THEREOF

FIELD OF THE INVENTION

The present invention relates to high temperature and bright red ink-jet ink for ceramic decoration, its preparation method and application thereof.

BACKGROUND OF THE INVENTION

The application of ink-jet printing technology in ceramic industry has been more than 10 years. Due to non-contact printing method is used in ink-jet printing, which is a kind of ink through the nozzle jet to all to be printed on the surface of the medium, there is not too many demands for the surface shape of the printing medium. When printing, the artwork information is input to the computer system of an ink-jet printing machine, which can be used for printing. Unlike traditional printing technology that platemaking is first used, so the ink-jet printing technology has the advantages of simple operation, short development cycle, employee labor intensity low, quantity production, which can realize the demand for personalized customization. But its requirement for ink is very harsh, because of the small size of the nozzle, the particle size of the ink is almost all to reach the nanometer level. As is known to all, from the color point of view, pigment particle size is smaller, its color is more difficult. So far, variety of ink is still relatively little, such as high temperature and bright red ink is blank, and bright red is one of the most important three element color. If there is no bright red, the decorative effect of the ceramic products is not bright enough, not gorgeous, which is currently the world ceramic ink-jet printing technology's biggest problem.

SUMMARY OF THE INVENTION

For the above technical problem, the present invention provides high temperature and bright red ink-jet ink for ceramic decoration, its preparation method and application thereof. On the base that the existing ink-jet ink production process, ink-jet printing equipment and ink-jet printing process are not made major changes, high temperature bright red ink basic glaze powder composition, basic glaze frit powder composition, solvent composition, basic glaze powder and bright red pigment grinding method and particle size optimization, ink composition and processing methods are adjusted and optimized. Thus the performance of high temperature bright red ink can meet the requirement of the use of ink-jet printing machine, and after high temperature firing (1080° C.~1230° C.), the surface decoration color of ceramic tile sprayed a single printed high temperature bright red is bright red, colorful, pure red, and at the superposing place with other color ink-jet printing ink, the color is bright, colorful, color gamut broad. At the same time, the technology has strong universality and is easy in the industry promote.

To solve the above problem, the present invention is achieved by the following solution.

High temperature and bright red ink-jet ink for ceramic decoration of the present invention, which is prepared according to the following parts by weight of component:

Basic glaze powder 15~25 portions, bright red pigment 15~25 portions, solvent 50~70 portions;

Wherein basic glaze powder is prepared according to the following parts by weight of component:

Frit 86~90 portions, kaolin 2~4 portions, titanium dioxide 4~6 portions, cerium oxide 4~6 portions, plus carboxymethyl cellulose 0.02~0.04 portion, sodium tripolyphosphate 0.2~0.4 portion, water 37~40 portions;

Wherein frit is prepared according to the following parts by weight of component:

$SiO_2$ 58.5~60.5%, $Al_2O_3$ 6.5~8.5%, CaO 8.5~10.5%, MgO 0.2~0.4%, $K_2O$ 3.5~5.5%, $Na_2O$ 0.6~0.8%, ZnO 2.5~4.5%, SrO 0.6~0.8%, $ZrO_2$ 2.5~4.5%, PbO 0.8~1.2%, $Gd_2O_3$ 0.6~0.8%, $La_2O_3$ 3~5%, the sum of all components is 100%;

Wherein bright red pigment is made by superfine grinding the pigment coated by cadmium selenium red;

Wherein solvent is prepared according to the following parts by weight of component:

Weakly polar~moderately polar organic solvent 100 portions, dispersing agent 0.4~2.4 portions, stabilizer 1~3.4 portions;

Wherein solubility parameter of weakly polar~medium polar organic solvent is 14-23 $(J/cm^3)^{1/2}$, and weakly polar~medium polar organic solvent commonly used in the ceramics field can be selected.

Furthermore, weakly polar~medium polar organic solvent is one or more mixing of tetrahydrofuran, cyclohexanone, castor oil, ethylene glycol monobutyl ether, diethylene glycol monobutyl ether, dichloro ethane, kerosene, is amyl alcohol and isoamyl alcohol.

In which, dispersing agent is oil-soluble small-molecular-weight organism, and is one or more mixing of BYKJET-9131、BYKJET-9132、BYKJET-9133、Solsperse 20000、Solsperse 17000 and Solsperse 8000.

In which, stabilizer is oil-soluble macromolecule organism, and is one or more mixing of the epoxy resin, polyvinyl butyral, DISPERBYK-109, DISPERBYK-115, DISPERBYK-174 and DISPERBYK-180.

The present invention also relates to a preparation method for high temperature and bright red ink-jet ink for ceramic decoration, including the following steps:

A. The preparation for basic glaze powder:

basic glaze powder is prepared according to the following parts by weight of component:

Frit 86~90 portions, kaolin 2~4 portions, titanium dioxide 4~6 portions, cerium oxide 4~6 portions, plus carboxymethyl cellulose 0.02~0.04 portion, sodium tripolyphosphate 0.2~0.4 portion, water 37~40 portions are ground by the ball mill into grinding fineness of 325 mesh, and its sieve residue is glaze quality percentage of 0.2%~0.4%. The removal of iron screen, a baking powder and then with superfine sand mill, a planetary type grinding machine or other superfine grinding machine, this powder is ground to a particle size≤0.5 μm, wherein $d_{50}$≤0.25 μm, $d_{90}$≤0.40 μm, thus basic glaze powder is obtained.

Wherein frit is prepared according to the following parts by weight of component:

$SiO_2$ 58.5~60.5%, $Al_2O_3$ 6.5~8.5%, CaO 8.5~10.5%, MgO 0.2~0.4%, $K_2O$ 3.5~5.5%, $Na_2O$ 0.6~0.8%, ZnO 2.5~4.5%, SrO 0.6~0.8%, $ZrO_2$ 2.5~4.5%, PbO 0.8~1.2%, $Gd_2O_3$ 0.6~0.8%, $La_2O_3$ 3~5%, the sum of all components is 100%;

quartz, potassium sodium feldspar, talc, calcium carbonate, potassium carbonate, zinc oxide, strontium carbonate, zirconium powder, red lead, gadolinium oxide and lanthanum oxide, which contains the above component and all of which size is less than 150 mesh, is prepared according to the range of ingredients, mixed by a mixing machine, melted by a frit tank furnace, melting temperature range of 1500° C.~1520° C. and water quenched into frit particles, and frit is achieved by drying.

B. The preparation for solvent:

solvent is prepared according to the following parts by weight of component:

weakly polar~moderately polar organic solvent 100 portions, dispersing agent 0.4~2.4 portions, stabilizer 1~3.4 portions;

The dispersing agent and the stabilizing agent are respectively dissolved in the weakly polar solvent according to the following parts by weight of component, and the solvent can be achieved by evenly mixing.

Wherein solubility parameter of weakly polar~medium polar organic solvent is 14-23 $(J/cm^3)^{1/2}$, and weakly polar~medium polar organic solvent commonly used in the ceramics field can be selected.

Furthermore, weakly polar~medium polar organic solvent is one or more mixing of tetrahydrofuran, cyclohexanone, castor oil, ethylene glycol monobutyl ether, diethylene glycol monobutyl ether, dichloro ethane, kerosene, is amyl alcohol and isoamyl alcohol.

In which, dispersing agent is oil-soluble small-molecular-weight organism, and is one or more mixing of BYKJET-9131、BYKJET-9132、BYKJET-9133、Solsperse 20000、Solsperse 17000 and Solsperse 8000.

In which, stabilizer is oil-soluble macromolecule organism, and is one or more mixing of the epoxy resin, polyvinyl butyral, DISPERBYK-109, DISPERBYK-115, DISPERBYK-174 and DISPERBYK-180.

C. The preparation for bright red pigment:

with superfine sand mill, a planetary type grinding machine or other superfine grinding machine, the pigment coated by cadmium selenium red is ground to a particle size≤0.5 μm, wherein $d_{50}$≤0.25 μm, $d_{90}$≤0.40 μm, thus basic glaze powder is obtained.

D. The preparation for high temperature and bright red ink-jet ink:

high temperature and bright red ink-jet ink is prepared according to the following parts by weight of component:

Basic glaze powder 15~25 portions, bright red pigment 15~25 portions, solvent 50~70 portions;

according to the following parts by weight of component, firstly get the solvent prepared in step B, and put into a stainless steel or plastic bucket with a mixing device or ultrasonic device or both, then get basic glaze powder prepared in step A, while stirring (ultrasonic) basic glaze powder is added to the solvent. Until the basic glaze powder and solvent are mixed evenly, and then while stirring the remaining bright red pigment is slowly put into the mixture until evenly. Finally, use planetary grinding machine or other superfine grinding machine for grinding to ink-jet printing machine required by parameters of superfine sand mill, through the sieve into the plastic bucket for storage. The high temperature bright red ink-jet ink is achieved.

The present invention also relates to a ceramic brick printed with high temperature and bright red ink-jet ink, according to the requirement of design, high temperature and bright red ink-jet ink according to the above preparation method for high temperature and bright red ink-jet ink for ceramic decoration, and other color ink-jet ink are put in the ink box of the ink-jet printing machine in order. Ink-jet print on the ceramic tile normally applied the bottom and surface glaze, and then enter the roller kiln to fire, firing temperature range of 1080° C.~1230° C., through the processes of grinding and classification, finished products are achieved.

High temperature and bright red ink-jet ink for ceramic decoration, its preparation method and application thereof of the present invention, basic glaze powder composition, basic glaze frit powder composition, solvent composition, basic glaze powder and bright red pigment grinding method and particle size optimization, ink composition and processing methods are adjusted and optimized. Thus the performance of high temperature bright red ink can meet the requirement of the use of ink-jet printing machine, and after high temperature firing (1080° C.~1230° C.), the surface decoration color of ceramic tile sprayed a single printed high temperature bright red is bright red, colorful, pure red, and color at the superposition of other color ink-jet printing ink is bright, colorful, color gamut broad. Because its fineness of high temperature and bright red ink-jet ink for ceramic decoration of the present invention is very fine, to meet the requirement of the use of nozzle, $d_{50}$≤0.5 μm, $d_{90}$≤1 μm. As is known to all, pigment particle size is smaller, its color is more difficult. So far, variety of ink is still relatively little, such as high temperature and bright red ink is blank. In order to solve this world problem in the industry, the inventor of this application does tens of thousands of times of tests. By optimizing the composition of the basic glaze powder and basic glaze frit powder, first add the appropriate amount of Cao, PbO, SrO, ZrO2 oxides promoting bright red in basic glaze frit powder. As is known to all, in many pigment that can make ceramic products obtain bright red decorative effect, only pigment of the sulphide selenide cadmium as coloring agent can produce the most bright color and the most pure decorative effect. But because sulphide selenide cadmium has poor thermal stability, when the air is heated to more than 500° C. it will begin to break down, to more than 800° C. it will be completely decomposed and oxidized to be black, even completely lose the color of red, so now in market cadmium selenium red pigment is ZrSO4 small crystal package coated by selenium and sulfur cadmium crystal in order to stabilize the color. But even so, the coated cadmium selenium red pigment is not stable, in the firing it is very sensitive to the atmosphere of the kiln chamber, easily oxidized or black by the effects of SO2, also ZrSO4 package type structure is easy to damage under external force, and ZrSO4 tiny crystals also easily separate from selenium and sulfur cadmium telluride crystal chromophore beyond 1000° C. high temperature, thus losing the effect that protect cadmium sulfide selenide crystal chromophores. Therefore, basis glaze powder and the red occlusion pigment of cadmium selenium are separately ground by the present inventor in the course of processing. In the control of fineness, basic glaze powder is as small as possible, whose particle size is under 0.5 μm, wherein $d_{50}$≤0.25 μm, $d_{90}$≤0.4 μm. On the one hand, this fineness can make the start melting temperature of basic glaze powder become lower, on the other hand, in the case of ensuring the ink performance (the ink performance requirement is $d_{50}$≤0.5 μm, $d_{90}$≤1 μm), the fineness of bright red pigment can be slightly rough, to be easy to emit bright red. Because pigment fineness is thinner, the effect of emitting color is less. In the ink process firstly basic glaze powder and solvent are mixed evenly in slowly mixing process. Then bright red pigment is added, while slowly stirring, which basic glaze powder and solvent form a colloidal suspension. When bright red pigment is added while slowly stirring, the colloidal suspension will slowly wet bright red pigment and form a gelatinous protective film around the bright red pigment particles. On the one hand, it ensures pigment and basic glaze powder will not occur separation phenomenon, because of different fineness, to ensure ink performance. On the other hand, the protective film can also protect Cadmium Selenium Red conglomerates from oxidation and sulfidation in high temperature calcination. Thus the color is pure and fresh, because adding method of titanium dioxide, cerium oxide in basic glaze powder is not adding in basic frit, because when the raw frit is added, titanium dioxide, cerium oxide will react with other oxides and generate new compounds, thus will reduce the protective effect of Cadmium Selenium Red conglomerates. Because the fineness of basic glaze powder is very fine, and star melting temperature is low, the inventor in the testing process through visualization of high temperature microscope observation found, basic glaze powder of the invention will begin to melt at 650° C. At this time, titanium dioxide, cerium oxide and basic frit powder together form a low temperature melt like enamel, the melt surrounds the cadmium sulfide selenide crystal chromophores, to protect cadmium sulfide selenide crystal chromophore. Because in the invention basic glaze powder adds the right amount of lanthanum oxide, cerium oxide, gadolinium oxide, lanthanum, cerium, gadolinium are lanthanide elements, they are members of the rare earth elements, can form a stable complex ions and organic chelates of trivalent cations, mixed rare earth elements in the heat available for vitreous decoloring agent and desulfurization agent and an oxidation agent, it is these rare earth elements in high temperature special performance that can guarantee that the sulphide selenide cadmium crystal chromophores will not be sulfide and oxide in high temperature, so as to ensure high temperature bright red ink red be pure and colorful. As is known to all, the core part of ink-jet printing machine is a nozzle which is a kind of high precision electronic component, which need ink performance requirement be very high, in the production process ink properties such as viscosity, liquidity, surface tension, electrical conductivity and bubble in the event of small changes will cause blockage, and even burn the nozzle, thus affecting the normal use of the ink jet printing machine. Also because emitting color effect of bright red is very sensitive to the kiln atmosphere in the firing process, slightly variation can not achieve the desired result, so solvent in ink-jet ink need to ensure that the ink has good stability and in use its viscosity, fluidity, surface tension, electrical conductivity and bubble is not easy to change, also the residue of solvent in ink is not effective on emitting color of bright red at high temperature, so solvent formula composition of high temperature bright red ink-jet ink is also important. Common solvent composition is mostly oil organic and polymer composition. At the same time in order to guarantee the storage, some solvent is added by preservatives and suspending agent, at high temperature volatile gas produced by these organic compounds have great influence on the atmosphere of the kiln, thus having great influence on particularly emitting color effect of bright red. At the same time, preservative, suspending agent and high molecular polymer added in the common solvent is calcined at high temperature of 600° C. or above, and the residue content is relatively high. Because sulphide selenide cadmium has poor thermal stability, when the air is heated to more than 500° C. it will begin to break down, to more than 800° C. it will be completely decomposed and oxidized to be black, even completely lose the color of red, so these residues seriously affect emitting color of Cadmium sulfide crystal. The inventor through hundreds of experiments, according to a variety of solvents on market produce different effects on bright red to emit color at heat temperature, and with the help of advanced analytical instruments and equipment, optimize high temperature bright red ink-jet ink solvent composition, so that at the same time ensure good using requirements of ink-jet printing machine, the solvent volatilize completely calcined at 400° C., do not leave residue, so as to ensure emitting color effect of bright red printing glaze. Optimization of processing method can ensure that the ink will not entrained bubbles, does not produce charge and molecular chain destroying colloidal suspensions; also can guarantee the basic glaze powder and pigment to disperse evenly and to be not easy to agglomerate, so as to guarantee the performance of the ink.

There are following advantages for high temperature and bright red ink-jet ink for ceramic decoration, its preparation method and application thereof of the present invention.

1. Because of basic glaze powder composition, basic glaze frit powder composition, solvent composition, basic glaze powder and bright red pigment grinding method and particle size optimization, ink composition and processing methods, thus the performance of high temperature bright red ink can meet the requirement of the use of ink-jet printing machine, and after high temperature firing (1080° C.~1230° C.), the surface decoration color of ceramic tile sprayed a single printed high temperature bright red is bright red, colorful, pure red, and color at the superposition of other color ink-jet printing ink is bright, colorful, thus breaking through the world problem that lacking high temperature bright red color of the ceramic decoration, so that the application of ink-jet printing technology in the field of ceramic decoration offers a broader prospect.
2. The performance of high temperature and bright red ink-jet ink is stable, which can be adapt to all ceramic ink-jet printing models and various types of nozzle the current market, and can be used together with other colors of the market, making the color of the ceramic surface decoration products more bright, color range wider.
3. The quality of ceramic tile products jet printing high temperature bright red ink-jet ink for ceramic decoration will not have any effect, color decoration more broad, close to nature, pattern design is more convenient, main technical indexes: friction coefficient, acid and alkali resistance, surface quality, lead and cadmium dissolution amount and radioactivity reached the standards of GB/t4100-2006 and HJ/T297-2006 requirement.

4. With the existing ink-jet ink and the existing production process of ink-jet printing, the sensitivity of the bright red emitting color to the kiln firing atmosphere is greatly reduced, and the industrial scale is easy to be realized.

BRIEF DESCRIPTION OF THE DRAWINGS

FIGURE is a production process flow chart of high temperature and bright red ink-jet ink for ceramic decoration, its preparation method and application thereof of the present invention.

DETAILED DESCRIPTION OF THE PREFERRED EMBODIMENTS

Below in conjunction with embodiment, the present invention is described in further.

Embodiment 1

High temperature and bright red ink-jet ink for ceramic decoration, its preparation method and application thereof of the present invention, first prepare basic glaze power:

frit is prepared

According to table 1 chemical composition ratio of the corresponding raw materials selection: quartz, potassium sodium feldspar, talc, calcium carbonate, potassium carbonate, zinc oxide, strontium carbonate, zirconium powder, red lead, gadolinium oxide and lanthanum oxide, which contains the above component and all of which particle size is less than 150 mesh, is prepared according to the range of ingredients, mixed by a mixing machine, melted by a frit tank furnace, melting temperature range of 1500° C.~1520° C. and water quenched into frit particles, and frit is achieved by drying.

TABLE 1 chemical composition of frit (weight percentage, %)

|    | $SiO_2$ | $Al_2O_3$ | CaO | MgO | $K_2O$ | $Na_2O$ | ZnO | SrO | $ZrO_2$ | PbO | $Gd_2O_3$ | $La_2O_3$ |
|----|------|-------|------|------|------|-------|------|------|-------|------|-------|-------|
| 1# | 60.5 | 6.5   | 10.5 | 0.2  | 5.5  | 0.6   | 4.5  | 0.6  | 4.5   | 0.8  | 0.8   | 5     |
| 2# | 58.5 | 8.5   | 10.5 | 0.4  | 4.5  | 0.8   | 4.5  | 0.8  | 4.5   | 1.2  | 0.8   | 5     |
| 3# | 59.5 | 7.5   | 10.5 | 0.3  | 5.5  | 0.7   | 4.2  | 0.7  | 4.5   | 1    | 0.6   | 5     |
| 4# | 60.5 | 8.5   | 9.5  | 0.4  | 5.5  | 0.8   | 4.5  | 0.8  | 3.5   | 1.2  | 0.8   | 4     |
| 5# | 60.5 | 8.5   | 8.5  | 0.3  | 4.8  | 0.8   | 4.5  | 0.8  | 4.4   | 1.2  | 0.7   | 5     |
| 6# | 60.5 | 8.5   | 10.5 | 0.4  | 5.5  | 0.8   | 3.5  | 0.8  | 4.5   | 1.2  | 0.8   | 3     |
| 7# | 60.3 | 8.4   | 10.4 | 0.4  | 3.5  | 0.8   | 4.5  | 0.8  | 4.3   | 1.1  | 0.7   | 4.8   |
| 8# | 60.5 | 8.5   | 10.5 | 0.4  | 5.4  | 0.7   | 4    | 0.7  | 2.5   | 1.1  | 0.8   | 4.9   |
| 9# | 60.4 | 8.4   | 10.4 | 0.3  | 5.5  | 0.7   | 2.5  | 0.8  | 4.4   | 1.1  | 0.7   | 4.8   | prepare basic glaze power:

according to table 2 of basic glaze powder composition weight frit, kaolin, titanium dioxide, cerium oxide, carboxymethyl cellulose, sodium tripolyphosphate, water are ground by the ball mill into grinding fineness of 325 mesh, and its sieve residue is glaze quality percentage of 0.2% to 0.4%. The removal of iron screen, a baking powder and then with superfine sand mill, a planetary type grinding machine or other superfine grinding machine, this powder is ground to a particle size≤0.5 μm, wherein $d_{50}$≤0.25 μm, $d_{90}$≤0.40 μm, thus basic glaze powder is obtained.

TABLE 2 chemical composition of basic glaze powder (weight percentage, %)

|    | frit | kaolin | titanium dioxide | cerium oxide | carboxymethyl cellulose | sodium tripolyphosphate | water |
|----|------|--------|------------------|--------------|-------------------------|--------------------------|-------|
| 1# | 86   | 2      | 6                | 6            | 0.02                    | 0.2                      | 37    |
| 2# | 88   | 3      | 4                | 5            | 0.03                    | 0.4                      | 38.5  |
| 3# | 90   | 2      | 4                | 4            | 0.04                    | 0.3                      | 40    |
| 4# | 86   | 4      | 5                | 5            | 0.03                    | 0.4                      | 38.5  | solvent is prepared:

The dispersing agent and the stabilizing agent are respectively dissolved in the weakly polar~moderately polar organic solvent according to the following weight and composition of table 3, and the solvent can be achieved by evenly mixing.

TABLE 3

| | chemical composition of solvent (weight percentage, %) | | |
|---|---|---|---|
| | weakly polar~moderately polar | dispersing | stabilizin |
| 1# | 100 | 0.4 | 3.4 |
| 2# | 100 | 1.4 | 1.6 |
| 3# | 100 | 2.4 | 1.0 |
| 4# | 100 | 0.8 | 2.8 |
| 5# | 100 | 1.9 | 2.2 |

Wherein solubility parameter of weakly polar~medium polar organic solvent is 14-23 $(J/cm^3)^{1/2}$, and weakly polar~~medium polar organic solvent is one or more of tetrahydrofuran, cyclohexanone, castor oil, ethylene glycol monobutyl ether, diethylene glycol monobutyl ether, dichloro ethane, kerosene, is amyl alcohol and isoamyl alcohol. Also weakly polar~medium polar organic solvent can be all kinds of usual weakly polar~medium polar organic solvent whose solubility parameter is 14-23 $(J/cm^3)^{1/2}$ in this ceramics field.

In which, dispersing agent is oil-soluble small-molecular-weight organism, and is one or more mixing of BYKJET-9131、BYKJET-9132、BYKJET-9133、Solsperse 20000、Solsperse 17000 and Solsperse 8000.

In which, stabilizer is oil-soluble macromolecule organism and is one or more mixing of the epoxy resin, polyvinyl butyral, DISPERBYK-109, DISPERBYK-115, DISPERBYK-174 and DISPERBYK-180.

The preparation for bright red pigment:

with superfine sand mill, a planetary type grinding machine or other superfine grinding machine, the pigment coated by cadmium selenium red is ground to a particle size≤0.5 μm, wherein $d_{50}$≤0.25 μm $d_{90}$≤0.40 μm, thus bright red pigment is obtained.

The preparation for high temperature and bright red ink-jet ink:

According to the composition of table 4 of high temperature and bright red ink-jet ink weight the solvent prepared in the above steps, and put into a stainless steel or plastic bucket with a mixing device or ultrasonic device or both, then get basic glaze powder prepared in step A, while stirring (ultrasonic) basic glaze powder is slowly added to the solvent. Until the basic glaze powder and solvent are mixed evenly, and then while stirring the remaining bright red pigment is slowly put into the mixture until evenly. Finally, use planetary grinding machine or other superfine grinding machine for grinding to ink-jet printing machine required by parameters of superfine sand mill, through the sieve into the plastic bucket for storage. The high temperature bright red ink-jet ink is achieved.

TABLE 4

| | chemical composition of high temperature and bright red ink-jet ink (parts by weight) | | |
|---|---|---|---|
| | basic glaze power | bright red pigment | solvent |
| 1# | 15 | 20 | 65 |
| 2# | 20 | 25 | 55 |
| 3# | 25 | 15 | 60 |
| 4# | 25 | 25 | 50 |
| 5# | 15 | 15 | 70 |

The preparation for a ceramic brick printed with high temperature and bright red ink-jet ink:

according to the requirement of design, high temperature and bright red ink-jet ink according to the above preparation method for high temperature and bright red ink-jet ink for ceramic decoration, and other color ink-jet ink are put in the ink box of the ink-jet printing machine in order. Ink-jet print on the ceramic tile normally applied the bottom and surface glaze, and then enter the roller kiln to fire, firing temperature range of 1080° C.~1230° C., through the processes of grinding and classification, finished products are achieved. Product color is stable, emitting color of each part of the kiln is consistent without color difference. Observing the surface of the product, in a single spray printed the high-temperature red ink, ceramic tile products, showing pure and bright red in the printing and color colorful, light moisturizing. Through the color measurement instrument to measure value L*, a*, b* at the printing color, value a* of red glaze color is 57.28, showing a typical bright red color. In the overlay with other color ink-jet ink, emitting color is pure, rich color, wide color gamut, decorative effect and artistic beauty. The main indicators of the product test are as follows as table 5.

TABLE 5

| product quality test results | | | |
|---|---|---|---|
| Test item | Standard requirement | test result | judgement |
| Surface smoothness | Center bending +0.5%, −0.3% | −0.08~+0.1% | qualified |
| | Warp degree ±0.5% | −0.06%~+0.1% | |
| | Edge bending +0.5%, −0.3% | −0.08%~+0.1% | |
| surface quality | At least 95% of the brick has no obvious | qualified | qualified |
| Crazing | no glaze crack after the test | qualified | qualified |
| Pollution | More than 3 level | 5 level | qualified |
| Family resistant | More than GB level | GA level | qualified |
| Swimming pool | More than GB level | GA level | qualified |
| Acid resistance | Test classification for 3% HCl after 4D | GLA level | — |
| Alkali resistance | Inspection and classification of KOH | GLA level | — |

TABLE 5-continued product quality test results

| Test item | Standard requirement | test result | judgement |
|---|---|---|---|
| Thermal shock | Test results after the test report | No crack | — |
| Internal | A ≤ 1.0 | 0.5 | qualified |
| External | A ≤ 1.3 | 0.8 | qualified |
| Soluble lead content | ≤20 mg/kg | 9.62 | qualified |
| Soluble cadmium content | ≤5 mg/kg | 1.93 | qualified |
| Friction coefficient | ≥0.5 | dry process 1.09 | qualified |

The above stated is only preferable embodiments of the present invention, and it should be noted that the above preferable embodiments do not limit the present invention. The claimed scope of the present invention should be based on that defined by the claims. For a skilled person in this technical field, without departing from spirit and scope of the present invention, any improvement and amendment can be made, and these improvement and amendment should belong to the claimed scope of the present invention.

The invention claimed is:

1. A high temperature and bright red ink-jet ink for ceramic decoration, characterized in that,
which is prepared according to the following parts by weight of component:
basic glaze powder 15~25 portions, bright red pigment 15~25 portions, solvent 50~70 portions;
wherein basic glaze powder is prepared according to the following parts by weight of component:
frit 86~90 portions, kaolin 2~4 portions, titanium dioxide 4~6 portions, cerium oxide 4~6 portions, plus carboxymethyl cellulose 0.02~0.04 portion, sodium tripolyphosphate 0.2~0.4 portion, water 37~40 portions;
wherein frit is prepared according to the following parts by weight of component:
$SiO_2$ 58.5~60.5%, $Al_2O_3$ 6.5~8.5%, CaO 8.5~10.5%, MgO 0.2~0.4%,
$K_2O$ 3.5~5.5%, $Na_2O$ 0.6~0.8%, ZnO 2.5~4.5%, SrO 0.6~0.8%,
$ZrO_2$ 2.5~4.5%, PbO 0.8~1.2%, $Gd_2O_3$ 0.6~0.8%, $La_2O_3$ 3~5%, the sum of all components is 100%;
wherein bright red pigment is made by superfine grinding the pigment coated by cadmium selenium red;
wherein solvent is prepared according to the following parts by weight of component:
weakly polar~moderately polar organic solvent 100 portions, dispersing agent 0.4~2.4 portions, stabilizer 1~3.4 portions;
Wherein solubility parameter of weakly polar~medium polar organic solvent is 14-23 $(J/cm^3)^{1/2}$, and weakly polar~~medium polar organic solvent commonly used in the ceramics field can be selected;
dispersing agent is oil-soluble small-molecular-weight organism, and is one or more mixing of BYKJET-9131, BYKJET-9132, BYKJET-9133, Solsperse 20000, Solsperse 17000 and Solsperse 8000;
stabilizer is oil-soluble macromolecule organism, and is one or more mixing of the epoxy resin, polyvinyl butyral, DISPERBYK-109, DISPERBYK-115, DISPERBYK-174 and DISPERBYK-180.

2. The high temperature and bright red ink-jet ink for ceramic decoration according to the claim 1, characterized in that, the weakly polar~medium polar organic solvent is one or more mixing of tetrahydrofuran, cyclohexanone, castor oil, ethylene glycol monobutyl ether, diethylene glycol monobutyl ether, dichloro ethane, kerosene, is amyl alcohol and isoamyl alcohol.

3. A preparation method for high temperature and bright red ink-jet ink for ceramic decoration, characterized in that, including the following steps:
A. the preparation for basic glaze powder:
basic glaze powder is prepared according to the following parts by weight of component:
frit 86~90 portions, kaolin 2~4 portions, titanium dioxide 4~6 portions, cerium oxide 4~6 portions, plus carboxymethyl cellulose 0.02~0.04 portion, sodium tripolyphosphate 0.2~0.4 portion, water 37~40 portions are ground by the ball mill into grinding fineness of 325 mesh, and its sieve residue is glaze quality percentage of 0.2%~0.4%. The removal of iron screen, a baking powder and then with superfine sand mill, a planetary type grinding machine or other superfine grinding machine, this powder is ground to a particle size≤0.5 μm, wherein $d_{50}$≤0.25 μm, $d_{90}$≤0.40 μm, thus basic glaze powder is obtained,
wherein frit is prepared according to the following parts by weight of component:
$SiO_2$ 58.5~60.5%, $Al_2O_3$ 6.5~8.5%, CaO 8.5~10.5%, MgO 0.2~0.4%,
$K_2O$ 3.5~5.5%, $Na_2O$ 0.6~0.8%, ZnO 2.5~4.5%, SrO 0.6~0.8%,
$ZrO_2$ 2.5~4.5%, PbO 0.8~1.2%, $Gd_2O_3$ 0.6~0.8%, $La_2O_3$ 3~5%, the sum of all components is 100%;
quartz, potassium sodium feldspar, talc, calcium carbonate, potassium carbonate, zinc oxide, strontium carbonate, zirconium powder, red lead, gadolinium oxide and lanthanum oxide, which contains the above component and all of which size is less than 150 mesh, is prepared according to the range of ingredients, mixed by a mixing machine, melted by a frit tank furnace, melting temperature range of 1500° C.~1520° C. and water quenched into frit particles, and frit is achieved by drying;

B. the preparation for solvent:
solvent is prepared according to the following parts by weight of component:
weakly polar~moderately polar organic solvent 100 portions, dispersing agent 0.4~2.4 portions, stabilizer 1~3.4 portions;
the dispersing agent and the stabilizing agent are respectively dissolved in the weakly polar solvent according to the following parts by weight of component, and the solvent can be achieved by evenly mixing;
wherein solubility parameter of weakly polar~medium polar organic solvent is 14-23 $(J/cm^3)^{1/2}$, and weakly polar~medium polar organic solvent commonly used in the ceramics field can be selected;

in which, dispersing agent is oil-soluble small-molecular-weight organism, and is one or more mixing of BYKJET-9131, BYKJET-9132, BYKJET-9133, Solsperse 20000, Solsperse 17000 and Solsperse 8000;

in which, stabilizer is oil-soluble macromolecule organism, and is one or more mixing of the epoxy resin, polyvinyl butyral, DISPERBYK-109, DISPERBYK-115, DISPERBYK-174 and DISPERBYK-180;

C. the preparation for bright red pigment:

with superfine sand mill, a planetary type grinding machine or other superfine grinding machine, the pigment coated by cadmium selenium red is ground to a particle size≤0.5 μm, wherein $d_{50} \leq 0.25$ μm, $d_{90} \leq 0.40$ μm, thus basic glaze powder is obtained;

D. the preparation for high temperature and bright red ink-jet ink:

high temperature and bright red ink-jet ink is prepared according to the following parts by weight of component:

basic glaze powder 15~25 portions, bright red pigment 15~25 portions, solvent 50~70 portions;

according to the following parts by weight of component, firstly get the solvent prepared in step B, and put into a stainless steel or plastic bucket with a mixing device or ultrasonic device or both, then get basic glaze powder prepared in step A, while stirring (ultrasonic) basic glaze powder is added to the solvent. Until the basic glaze powder and solvent are mixed evenly, and then while stirring the remaining bright red pigment is slowly put into the mixture until evenly. Finally, use planetary grinding machine or other superfine grinding machine for grinding to ink-jet printing machine required by parameters of superfine sand mill, through the sieve into the plastic bucket for storage. The high temperature bright red ink-jet ink is achieved.

4. The preparation method for high temperature and bright red ink-jet ink for ceramic decoration according to the claim 3, characterized in that, the weakly polar~medium polar organic solvent is one or more mixing of tetrahydrofuran, cyclohexanone, castor oil, ethylene glycol monobutyl ether, diethylene glycol monobutyl ether, dichloro ethane, kerosene, is amyl alcohol and isoamyl alcohol.

5. A ceramic brick printed with high temperature and bright red ink-jet ink, characterized in that, according to the requirement of design, high temperature and bright red ink-jet ink according to the preparation method for high temperature and bright red ink-jet ink for ceramic decoration of claim 2, and other color ink-jet ink are put in the ink box of the ink-jet printing machine in order. Ink-jet print on the ceramic tile normally applied the bottom and surface glaze, and then enter the roller kiln to fire, firing temperature range of 1080° C.~1230° C., through the processes of grinding and classification, finished products are achieved.

* * * * *